United States Patent
McLoughlin

[19]

[11] Patent Number: 5,932,987
[45] Date of Patent: Aug. 3, 1999

[54] VARIABLE STEP RATE PRECISION PUMPING APPARATUS

[75] Inventor: Robert F. McLoughlin, Pelham, N.H.

[73] Assignee: Millipore Corporation, Bedford, Mass.

[21] Appl. No.: 09/060,524

[22] Filed: Apr. 14, 1998

[51] Int. Cl.⁶ .................................................. H02P 8/00
[52] U.S. Cl. ...................... 318/696; 318/695; 318/685; 318/254; 427/256; 604/66; 604/67
[58] Field of Search .................................. 318/138, 245, 318/254, 685, 696, 695; 604/66, 67, 50, 65, 122, 123, 131, 153; 417/22, 42, 45, 53

[56] References Cited

U.S. PATENT DOCUMENTS

| | | | |
|---|---|---|---|
| 4,137,011 | 1/1979 | Rock | 417/22 |
| 4,352,636 | 10/1982 | Patterson et al. | 417/22 |
| 4,457,751 | 7/1984 | Rodler | 604/66 |
| 4,670,007 | 6/1987 | Wheeldon et al. | 604/65 |
| 4,830,218 | 5/1989 | Shirkhan | 222/52 |
| 4,896,270 | 1/1990 | Kalmarkis et al. | 364/479 |
| 5,105,140 | 4/1992 | Matthews et al. | 318/696 |
| 5,134,349 | 7/1992 | Kruse | 318/254 |
| 5,202,613 | 4/1993 | Kruse | 318/254 |
| 5,212,434 | 5/1993 | Hsieh | 318/603 |
| 5,321,342 | 6/1994 | Kruse | 318/254 |
| 5,426,354 | 6/1995 | Bausch | 318/254 |
| 5,790,971 | 8/1998 | Hsieh | 701/99 |

*Primary Examiner*—Paul Ip
*Attorney, Agent, or Firm*—Gray Cary Ware & Freidenrich

[57] ABSTRACT

A method and apparatus for controlling a low volume, low rate precision dispensing pump for photochemicals and the like comprises generating constant current signals having magnitudes related by sin and cos values to the angular step size of the stepper motor pump, and varying the magnitudes smoothly over an incremental range of angles to vary the quantity of liquid dispensed. The step size and step rate can be varied to provide a desired liquid dispense rate. The magnitude of the current applied to the motor is ramped up and down while maintaining constant the relative relationships in the magnitudes of the currents applied in order to smoothly step the motor over a desired step angle.

18 Claims, 2 Drawing Sheets

VARIABLE STEP RATE PRECISION PUMPING APPARATUS

BACKGROUND OF THE INVENTION

This invention relates generally to variable pumping methods and apparatus, and more particularly to low volume, low rate precision dispensing pumping apparatus.

There are many applications where precise control over the amount and/or rate at which a fluid is dispensed by pumping apparatus is necessary. In semiconductor processing, for example, it is important to control very precisely the amount and the rate at which photochemicals such as photoresist are applied to a semiconductor wafer being processed to manufacture semiconductor devices. The coatings applied to semiconductor wafers during processing typically require a flatness across the surface of the wafer that is measured in angstroms. Many processes today have requirements of the order 30 angstroms or less. The rate at which processing chemicals such as photoresists are applied to the wafer and spun out through centrifugal force to the edges of the wafer has to be controlled in order to ensure that the processing liquid is applied uniformly. It is also critical to control the rate and volume at which photoresist chemicals are applied to the wafer in order to reduce unnecessary waste and consumption. Many of the photochemicals used in the semiconductor industry today are not only toxic, but they are very expensive, frequently costing as much as $1,000 per liter. Thus, because of the cost of the chemicals as well as the difficulties in handling toxic materials, it is necessary to ensure that enough of the photoresist is applied to the wafer to satisfy processing requirements while minimizing excessive consumption and waste.

Another important requirement for semiconductor processing is the ability to repeatedly dispense very precisely a controlled amount of processing chemical each time, since variations in the amount of chemicals can adversely impact consistency from wafer to wafer. In the past, because of the unrepeatability as well as the inability to precisely control the amount of chemical being dispensed, many pumps had to dispense 50% to 100% more liquid than needed in order to ensure a sufficient quantity for processing requirements. This has resulted in waste and increased processing costs.

Some chemical dispensing pumps currently in use are known as half-step pumps. These pumps which are driven by a DC motor have the ability to step or rotate by a fixed angular amount. Each time the pump is advanced one step, it dispenses a predetermined amount of fluid. Typical half-stepping pumps use motors having approximately 200 sets of windings. Each winding corresponds to an angle of 360°/200=1.8° per step. Half-step pumps energize the windings to produce fixed steps of 0.9° corresponding to the angular positions of adjacent windings and midway between. With a conventional half-stepper pump, the step size and the corresponding amount of liquid dispensed per step are fixed. Therefore, the only way to control the total amount of liquid dispensed is to control the rate at which the pump is stepped. The step rate and step size produce a fixed volume per unit time. Typically, the dispense volume is relatively large in terms of the desired volume, so that the only way to control volume is to reduce the step rate. This has the effect of causing the chemicals to be dispensed as pulses of liquid, with the amount of dispense directly proportional to the angular size of the step, rather than as a smooth continuous flow of liquid. It also precludes precise control of the dispense volume which can adversely affect the quality of the resulting semiconductor products.

Other approaches which have been used to control chemical dispensing apparatus and the rate and quantity of the dispense are to employ mechanical devices such as valves and stops. However, this also does not permit the precise control desired for semiconductor processing operations.

It is desirable to provide low volume, low rate chemical dispensing pumping apparatus capable of precise and repeatable control of the rate and volume of chemicals dispensed by the pumping apparatus, and it is to these ends that the present invention is directed.

SUMMARY OF THE INVENTION

The invention affords low volume, low rate precision dispensing pumping apparatus and method which enable precise and repeatable control of dispense rate and volume, and which overcome the foregoing and other disadvantages of known dispensing pumping apparatus and method. Dispensing pumping apparatus in accordance with the invention is capable of dispensing a smoothly varying amount of liquid down to very small quantities. It accomplishes this by controlling precisely the step size of a stepper motor pump. The invention can divide the typical step angle for a stepping motor pump by a variable factor to significantly reduce the size of and precisely control a step. It can reduce the typical 1.8° step size of a conventional pump by a factor of 32, for example, to produce a step of 0.056°. This produces much finer resolution and control over the amount of liquid dispensed. Furthermore, by controlling the update time (of control signals) to the pump, i.e., the time between steps, the invention provides the ability to control the dispense rate and volume precisely and repeatably.

In one aspect, the invention provides a method and an apparatus for dispensing liquids using a stepper motor pump of the type which dispenses a predetermined quantity of liquid for a predetermined angular rotation of the pump motor. In response to an input indicating a predetermined liquid dispense rate, the invention generates first and second digital signals, and converts the digital signals to corresponding first and second analog signals. The analog signals are used to drive first and second windings of the stepper motor pump at a rate which is selected to be within a predetermined range of update rates. The analog signals cause the pump to step at the corresponding step size, and the update rate causes the pump to step at the selected rate. The invention enables the first and second digital signals to be varied in order to vary the step size of the pump in order to control the amount of liquid dispensed.

In another aspect, the invention selects from a predetermined range of times an update step rate corresponding to a rate at which the stepper motor pump is stepped, and selects a step angle for the selected update step rate. The selected step angle is compared to a predetermined range of angles, and upon determining that the selected step angle is outside of the predetermined range, the update rate and step angle are varied in order to achieve a desired liquid dispense rate.

In yet another aspect, the invention enables an angular step size of the stepper motor pump to be selected for a desired liquid dispense rate in order to dispense a predetermined quantity of liquid. The update step rate at which the motor must be stepped to provide the desired dispense rate is determined and is compared to a predetermined range of step rates. Upon determining that the step rate falls outside of the predetermined range, a new step size is selected and a new update rate is determined for the new step size for the desired dispense rate. The new update step rate is again compared to the predetermined range of values and upon it again being determined to be outside of the range, the process is repeated until a combination of step size and update rate is determined which provides the desired dispense rate for an update step rate within the predetermined range of rates.

DESCRIPTION OF A PREFERRED EMBODIMENT

The invention is particularly well adapted to low volume, low rate chemical dispensing pumps of the type used for semiconductor processing, and will be described in that context. As will be appreciated, however, this is illustrative of only one utility of the invention.

Figure 1:
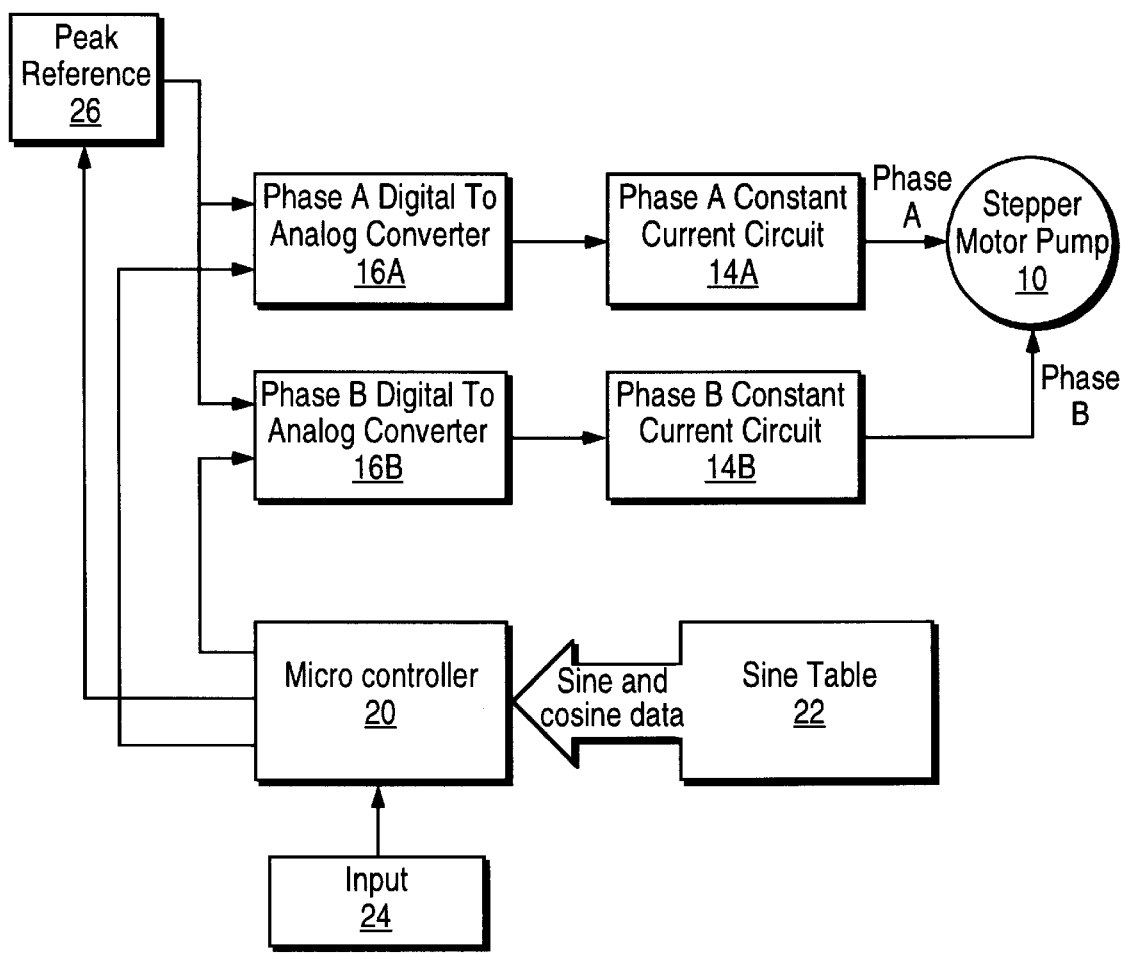
FIG. 1 is a block diagram of variable rate pumping apparatus in accordance with the invention.

FIG. 1 illustrates a block diagram of variable rate pumping apparatus in accordance with the invention which affords low volume, low rate precision control and repeatability over liquid dispensing. In particular, the invention affords a stepping motor pumping system which enables dispensing of small fractions of microliters of liquid at a dispensing rate which is variable over a predetermined rate range. This is accomplished using a stepper motor pump 10 and controlling the stepper motor pump in a manner which allows very precise control over the angular rotation of the motor, i.e., step amount, for each motor update. Stepper motor pump 10 may employ a conventional permanent magnet stepper motor comprising a plurality of electromagnetic windings arranged about the circumference of the circular motor housing to form a motor stator, and a permanent magnet rotor which can rotate in response to electromagnetic fields generated by energization of the electromagnetic windings. Each winding corresponds to an electromagnet, and a conventional stepper motor may have 200 windings spaced by an angle of 1.8°. When one of the electromagnetic windings is energized, the permanent magnet rotor will rotate and align itself with the energized winding. When the windings in the motor are energized in sequence or in steps, the permanent magnet rotor will spin as it is attracted to and temporarily aligned with each sequentially energized electromagnet. This type of operation is known as "full stepping" because each angular rotation or step of the rotor corresponds to the angular spacing of the windings. In order to increase the resolution, the rotor movement between steps may be decreased by simultaneously energizing adjacent windings with the same driving signal. This will cause the rotor to stop at an intermediate position midway between the windings, thereby doubling the angular resolution to 0.9°. This technique is referred to as "half-stepping". The dispense rate may be slowed to afford a smaller dispense volume of liquid with a conventional half or full step motor pump only by increasing the time between steps. This causes the dispensing to become rough and imprecise, with a fixed resolution, and with poor repeatability.

As indicated in FIG. 1, the stepper motor pump may be a half-stepper motor having two phase windings labeled as Phase A and Phase B. As shown in FIG. 1, the invention drives each of Phases A and B with a corresponding constant current source 14A and 14B, respectively. The constant current sources are driven by corresponding digital-to-analog converters (DACs) 16A and 16B, respectively. The DACs are, in turn, controlled by a micro-controller or microprocessor 20 which supplies digital data to each DAC that determine the output voltage of the DAC. The digital data may be preferably sine and cosine data from a sine table 22 stored in a memory such as a ROM. The sine and cosine data may be for various angles between 0° and 90°, with the increment between angles selected for a desired resolution. The microprocessor also receives an operator input from an input device 24 which specifies, for example, a desired liquid dispense rate as a volume of liquid per unit time, such as in milliliters per second (ml/sec). The microprocessor may additionally supply a control signal to a peak current control device 26 which provides a reference level signal to each of the DACs 16A and 16B for a purpose to be described.

As will be described shortly, the microprocessor 20 utilizes the sine and cosine information from the sine table 22 to provide corresponding digital signals to the DACs 16A and 16B, respectively. The DACs, in turn, drive constant current sources 14A and 14B to supply current to Phases A and B, respectively, of the stepper motor pump 10. By controlling the current supplied to Phases A and B, the invention controls the step size of the motor and, in turn, the dispense volume of the pump.

Figure 2:
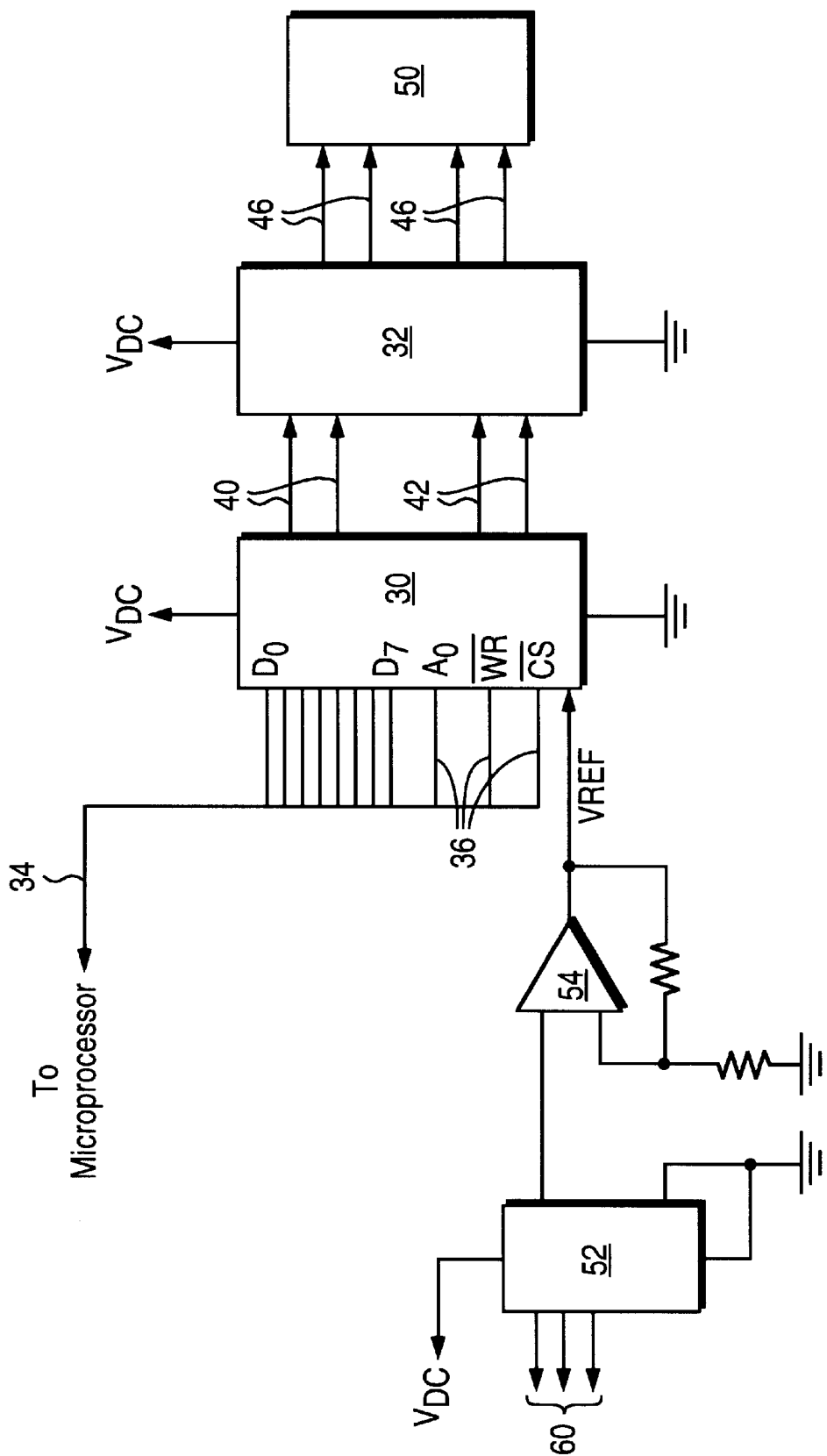
FIG. 2 is an electrical schematic illustrating a portion of the apparatus of FIG. 1.

FIG. 2 is a schematic diagram which illustrates in more detail preferred implementations of portions of the pumping apparatus of FIG. 1. The Phase A and Phase B DACs 16A and 16B may be implemented in a single dual DAC integrated circuit 30, and the constant current sources 14A and 14B may be implemented in a single dual constant circuit driver integrated circuit 32. Dual DAC 30 receives the digital data as 8 bits, for example, on lines D0–D7 from the microprocessor 20 (see FIG. 1) via a bus 34. The dual DAC also receives signals from the microprocessor on three lines A0, $\overline{WR}$ and $\overline{CS}$, labeled 36 in the drawing. Lines 36 select which of the two DACs in dual DAC 30 receives the 8-bit data supplied by the microprocessor. The microprocessor supplies the digital data sequentially to the two DACs, which output corresponding analog voltage signals on lines 40 and 42 for the two phases A and B, respectively. The analog voltages from the DACs are input to the dual constant current source 32, which supplies current via lines 44 and 46 to phases A and B, respectively, of the stepper motor via a motor connector 50. The current from each constant current driver is proportional to its corresponding input voltage on lines 40 and 42 from the DACs.

Another integrated circuit 52, which may comprise a digital variable resistor or "pot", supplies a reference voltage via a high impedance buffer amplifier 54 and line 56 to a voltage reference input of dual DAC 30. The input to the digital resistor 52 via lines 60 may be controlled by the microprocessor. This enables the microprocessor to control the reference voltage supplied to the DACs, which in turn controls the peak output voltage levels of the DACs to the constant current sources and the magnitude of the currents supplied to the motor phases A and B.

Integrated circuits 30, 32, 52 and 54 may be conventional commercially available integrated circuit devices. The dual DAC 30 may be, for example, an Ericsson type PBM4396250 integrated circuit. The constant current driver 32 may be an Ericsson integrated circuit model number PBL3777SO; the digital resistor may be an Ericsson integrated circuit AD8402AR10; and buffer amplifier 54 may be a LT1013OS integrated circuit. Other devices as well as discrete components may, of course, be used to implement the functions performed by the integrated circuits.

To control the step size of the stepper motor pump and, accordingly, the dispense volume, the invention controls the currents flowing through the phase A and B windings of the DC stepper motor of the pump in a manner similar to the operation of an AC motor. This technique controls the current in both the windings in accordance with the sin (sine) and cos (cosine) data from the sine table 22. For angles θ between 0° to 90°, the value of the sin increases with increasing angle, whereas the value of the cos decreases with increasing angle. For a selected angle, the sin and cos values from the table 22 cause the microprocessor to output corresponding digital data signals to the phase A and phase B DACs, respectively. The DACs convert the digital signals to voltages which directly control the currents flowing in phase windings A and B of the stepper motor pump. The strength of the magnetic field generated by each phase winding of the motor is proportional to the magnitude of the current passing through the winding. By energizing the two phase windings simultaneously with different magnitude currents, a magnetic field is produced having a resultant peak magnitude located at an intermediate angular position between the two windings determined by the location of the resultant of the magnetic fields produced by the time windings.

With a conventional full stepper motor having 200 windings spaced equally about the stator of the motor, the angle between adjacent phases is 1.8°. If the magnitudes of the currents in the two windings are equal, for example, the location of the resultant peak field will be midway between the windings. Using the sine table to generate sin and cos values for an angle θ between 0° and 90°, where the ratio θ/90 corresponds to a portion of the angular distance between windings, enables the position of the resultant magnetic field, and the step location, to be smoothly varied between windings. The invention thus permits the magnitude of the current in each phase winding of the motor to be controlled precisely which enables a resulting magnetic field to be produced at any desired angular position over the 1.8° angular distance between the two windings. This affords the ability to precisely control step size and position the motor to any desired location over this angular distance, resulting in a high step size resolution. In effect, by digitally controlling the current in the windings of the DC stepper motor, the invention emulates an AC current waveform, and affords a pseudo AC motor capable of being digitally positioned with high resolution, accuracy and repeatability. Since the dispense volume of the pump is proportional to step size, the invention enables high precision, repeatable dispensing of liquids.

In addition to controlling step size, the microprocessor of the invention also controls the update time between control instructions to the stepping motor of the pump. Preferably, the update time is in a range of between about 0.75 milliseconds to about 1.25 milliseconds. By controlling step size, which determines the volume dispensed and the update time, the time between subsequent dispenses, the system enables a desired dispense rate (volume per unit time) to be achieved. For a given dispense rate input to the system by user input device 24 (FIG. 1), the system selects a step size and an update time that is within the predetermined update time window, to achieve the desired rate. For a selected step size, the system may first compare the required update time to achieve the desired dispense rate with the predetermined update time range, e.g. 0.75 to 1.25 milliseconds. If the update time is outside of the predetermined range, another step size may be selected, and a new update time determined for the desired dispense rate. If this new update time is still not within the predetermined range, this process can be repeated until an acceptable step size and update time are determined.

Once the update time and step size are determined, the system uses the sin table to determine the actual values of the digital data signals which are to be written to the DACs. The outputs of the DACs drive the constant current sources which set the proper magnitudes of the current in the phases of the motor. This determines the step angle or step size. The motor is then controlled at the appropriate update rate within the update time window of 0.75 to 1.25 milliseconds in order to give the desired dispense rate. As the desired dispense rate increases so that it exceeds that achievable with the given step size and the maximum update rate, the step size can be changed to a higher value that would afford the desired dispense rate for an update rate within the desired update window. By using small step sizes and correspondingly small dispense volumes, the pump is able to move smoothly between steps in order to provide a smoother, more consistent supply of fluid. Moreover, it gives finer resolution over the volume dispensed which affords better process control. A full step pump may dispense, for example, 10 microliters per step. With the invention, the quantity of fluid dispensed can be reduced substantially to 0.01 microliters per step, for example. For a desired dispense rate, the appropriate step size and update rate can be selected to give the desired dispense rate.

An advantage of the digital variable resistor 52 of FIG. 2, which is controlled by the microprocessor to set the voltage reference level of the DACs, is that it enables the peak current to the phase windings of the motor to be controlled. As the reference voltage is varied, the output voltage of the DACs is also varied in a similar manner for a constant digital input. By controlling the reference voltage, the current in the two phases can be increased smoothly from zero to the operating current to provide the required torque to the motor to begin a dispensing cycle while retaining the proportions between the currents in each phase to give the desired step size. Following dispensing, the current can be brought back down while retaining the proportional relationship between the currents in each phase. This allows the current through the motor to be interrupted when the motor is not dispensing, i.e., is static. By allowing the current motor to be brought up and down as described, the invention enables a high current to be applied to the motor when stepping to produce high torque, yet reduces the current to zero when the motor is static, thereby allowing the motor to remain cool. Moreover, by controlling the rate of increase and decrease of motor current at the beginning and end of each dispense cycle, affords greater control over the step size and, accordingly, the dispense rate.

While the foregoing has been with reference to a particular embodiment, it will be appreciated by those skilled in the art that changes in this embodiment may be made without departing from the principles and the spirit of the invention, the scope of which is defined by the appended claims.

What is claimed is:

1. Apparatus for dispensing liquids using a stepper motor pump that has first and second windings which, upon being energized, step the pump by a predetermined angular step the quantity of liquid dispensed by the pump being determined by the angular step size, the apparatus comprising a controller for generating first and second digital signals in response to an input indicating a predetermined liquid dispense rate; means for converting the first and second digital signals to corresponding first and second analog signals; and means for driving the first and second windings of the stepper motor pump at a selected rate within a predetermined range of rates with the first and second analog signals to dispense liquid, the controller having means for varying the first and second digital signals to vary the step size of the pump to control the amount of liquid dispensed.

2. The apparatus of claim 1, wherein the first and second digital signals determine the magnitudes of the first and second analog signals, and wherein the varying means varies the digital signals to provide an angular step size which varies in accordance with the relationship between the digital signals up to a maximum incremental step size.

3. The apparatus of claim 2, wherein the controller comprises a stored table of values for the first and second digital signals, and the controller includes means for selecting a pair of values which have a relationship that provides a predetermined step size.

4. The apparatus of claim 3, wherein said table of values relates the first and second digital signals as the sin and cos of an angle between 0° and 90°, said angle corresponding to a step size between zero and said maximum incremental step size.

5. The apparatus of claim 4, wherein the controller further comprises means for selecting an update step rate within said predetermined range of rates corresponding to a rate at which the pump is stepped in order to dispense liquid at the predetermined liquid dispense rate.

6. The apparatus of claim 5, wherein the controller includes means for applying a number of updates to the pump corresponding to the number required to dispense a predetermined volume of liquid.

7. The apparatus of claim 1, wherein the converting means comprises first and second digital-to-analog converters for converting the first and second digital signals to corresponding first and second analog current signals, respectively, having magnitudes related to values of the digital signals.

8. The apparatus of claim 7, wherein the varying means includes means for increasing and decreasing the magnitudes of the first and second analog signals while maintaining a constant relationship between the signal magnitudes in order to cause the pump to execute a step.

9. An apparatus for dispensing liquids using a stepper motor pump of the type that dispenses a predetermined quantity of liquid for a predetermined angular step of a motor that drives the pump, the apparatus comprising means for inputting a dispense rate for a liquid to be dispensed as a specified quantity of liquid in a specified time; first means for selecting from a predetermined range of times an update step rate corresponding to a rate at which the pump is stepped; second means for selecting a step angle for the selected update step rate; means for comparing the selected step angle to a predetermined range of angles; means responsive to the comparing means determining the step angle to be outside the predetermined range of angles for varying the update rate and step angle to achieve the input liquid dispense rate; and means for controlling the pump at said update rate and said step angle to dispense liquid at said input dispense rate.

10. The apparatus of claim 9, wherein said controlling means comprises means for generating first and second digital signals related as sin and cos to a step angle within the range of step angles predetermined and which are less than a predetermined maximum incremental step angle, means for applying signals corresponding to the digital signals to the pump to step the pump, and means for varying the magnitudes of the digital signals to vary the step angle across said range of step angles.

11. The apparatus of claim 10, wherein the quantity of liquid dispensed by the stepper motor pump is proportional to the size of the step angle, and the means for controlling the pump comprises means for determining for a particular step angle a number of updates necessary to dispense the specified quantity of liquid.

12. The apparatus of claim 11, wherein the controlling means comprises means for converting the first and second digital signals to corresponding first and second current analog signals having magnitudes related to the values of the digital signals, and means for applying the analog signals to respective first and second windings of the stepper motor to step an angular amount determined by the relative magnitudes of the analog signals.

13. The apparatus of claim 12, wherein the controlling means further comprises means for varying the current applied to the motor to increase and decrease the current while maintaining constant the relative magnitudes of the analog signals.

14. A method of controlling a stepper motor pump of the type which dispenses a predetermined quantity of liquid for a predetermined angular rotation of the motor, comprising selecting, for a desired liquid dispense rate, an angular step size of the motor to dispense a predetermined quantity of liquid; determining an update step rate at which the motor must be stepped to provide the desired dispense rate; comparing the determined update step rate to a predetermined range of step rates, and, upon the determined update step rate falling outside of said predetermined range of step rates, selecting a new step size, determining a new update step rate, and comparing the new update step rate to the predetermined range of step rates; and repeating said selecting, determining and comparing until a combination of step size and update step rate is determined which provides the desired dispense rate for an update step rate within the predetermined range of step rates.

15. The method of claim 14 further comprising generating first and second digital signals having magnitudes mathematically related to the selected step size; converting the digital signals to analog current signals; and applying the current signals to respective first and second windings of the stepper motor to cause the stepper motor to rotate by an angular amount corresponding to the step size.

16. The method of claim 15, wherein said first and second digital signals have magnitudes related to the step size as sin and cos of an angle between 0° and 90° such that a ratio of the magnitudes equals another ratio of the step size to a maximum incremental step size.

17. The method of claim 16 further comprising controlling the magnitudes of the first and second current signals to increase and decrease the current to the motor while maintaining a constant relationship between the magnitudes of the current signals.

18. The method of claim 14 further comprising varying the update step rate over a predetermined range of rates and varying the step size in order to vary the quantity of liquid dispensed.

* * * * *